United States Patent [19]

Sasahara

[11] 4,051,709
[45] Oct. 4, 1977

[54] METHOD OF PRODUCING CONNECTOR FITTINGS FOR PIPES

[75] Inventor: Yoshio Sasahara, Tokyo, Japan

[73] Assignee: Kabushiki Kaisha Taishin Seisakusho, Tokyo, Japan

[21] Appl. No.: 714,905

[22] Filed: Aug. 16, 1976

[51] Int. Cl.² .............................................. B21D 22/00
[52] U.S. Cl. ........................................ 72/356; 72/377
[58] Field of Search ................ 72/356, 358, 359, 352, 72/377

[56] References Cited

U.S. PATENT DOCUMENTS

| 797,487 | 8/1905 | Baker | 72/356 |
|---|---|---|---|
| 1,410,093 | 3/1922 | Dallmeyer et al. | 72/356 |
| 2,748,932 | 6/1956 | Kaul | 72/356 X |

FOREIGN PATENT DOCUMENTS

| 7,529 | 12/1901 | Austria | 72/356 |

Primary Examiner—Leon Gilden
Attorney, Agent, or Firm—Armstrong, Nikaido & Marmelstein

[57] ABSTRACT

A method of producing connector fittings for pipes by using press machine comprising the steps of forming a semicircular recess in the upper surface of each of a pair of blanks placed in parallel and contact with each other as a first step, and forming a semicircular inner recess for holding flange of a pipe simultaneously with forming a pair of parts in which bolt holes are formed.

3 Claims, 21 Drawing Figures

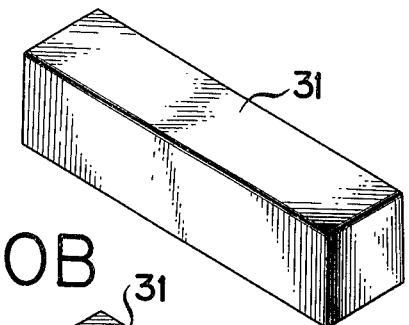
FIG. 10A
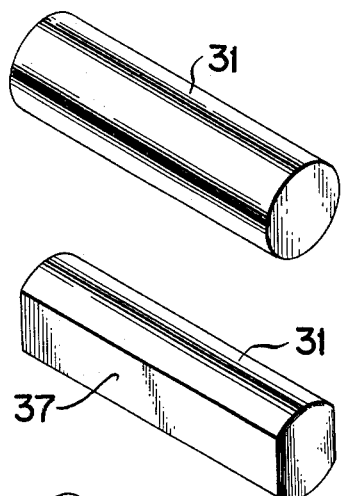
FIG. 11A
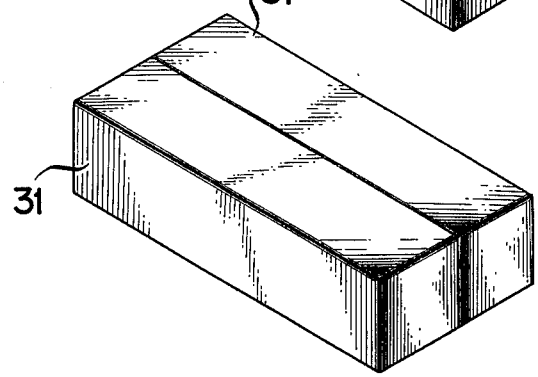
FIG. 10B
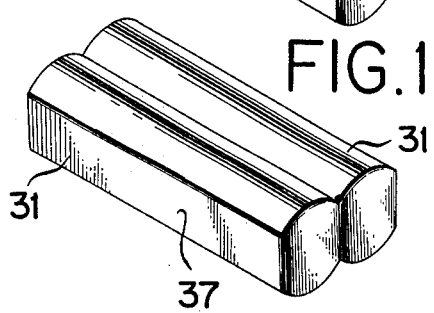
FIG. 11B
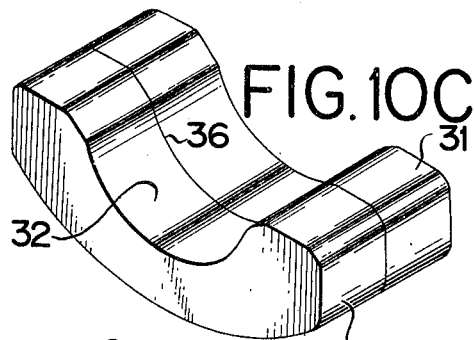
FIG. 10C
FIG. 11C
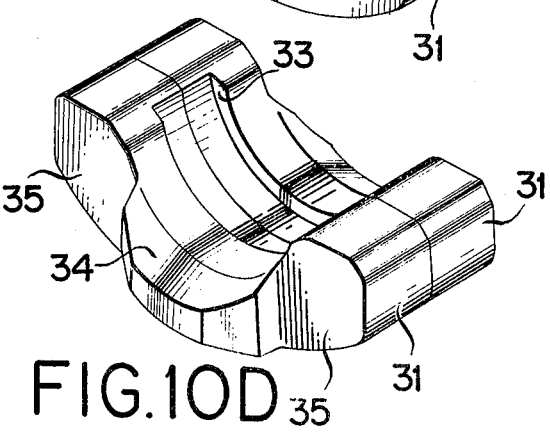
FIG. 10D

METHOD OF PRODUCING CONNECTOR FITTINGS FOR PIPES

BACKGROUND OF THE INVENTION

This invention relates to a method of producing connector fittings for pipes.

In the conventional method of producing connector fittings for pipes, a pair of connector fittings have been produced by forming doughtnut shaped blanks in a required shape by means of hot forging and cutting it along a centre line thereof. This method is however disadvantageous in that it takes a considerable time to form by hot forging and is therefore not suitable for mass production because of the need for the cutting process.

SUMMARY OF THE INVENTION

It is therefore an object of the present invention to provide a simple method of producing connector fittings for pipes in which the cutting process of the conventional method can be eliminated.

Another object of the present invention is to provide a method of producing connector fittings which can be formed by way of cold forging.

A still another object of the present invention is to provide a method of producing connector fittings without burs.

According to the present invention, connector fittings for pipes are produced by a press forming process comprising first and second steps. At the first step, two blanks are located in parallel relationship and in contact with each other and the upper surface of each of the blanks is formed with a semicircular recess, and at the second step each of the blanks is formed with a holding surface comprising a stepped portion for holding a flange of the pipe and bolt holes through which bolts can pass.

Other objects, features and advantages of the present invention will be readily apparent from the following description taken in conjunction with the following drawings.

DETAILED DESCRIPTION OF THE PREFERRED EMBODIMENTS

Figure 1:
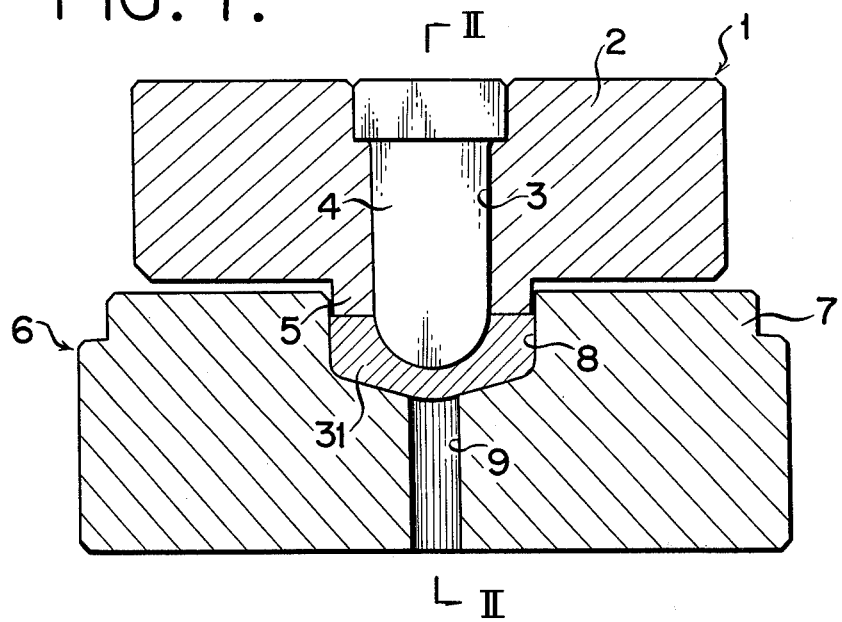
FIG. 1 is a longitudinal sectional view of dies used for the first step.
Figure 2:
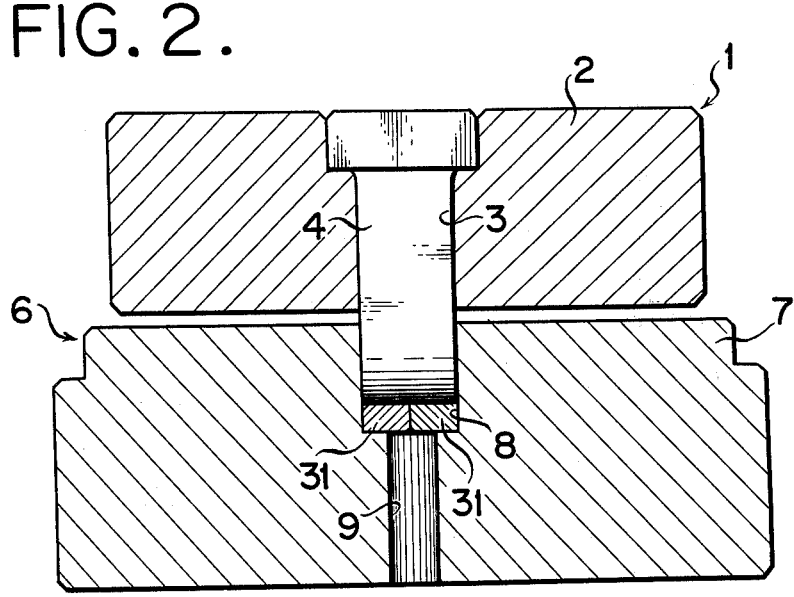
FIG. 2 is a sectional view taken along line II — II of FIG. 1.
Figure 3:
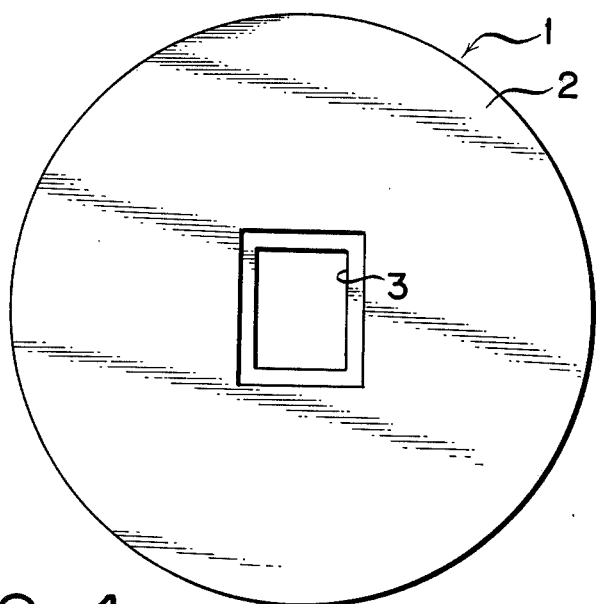
FIG. 3 is a plan view of an upper die used for the first step.
Figure 4:
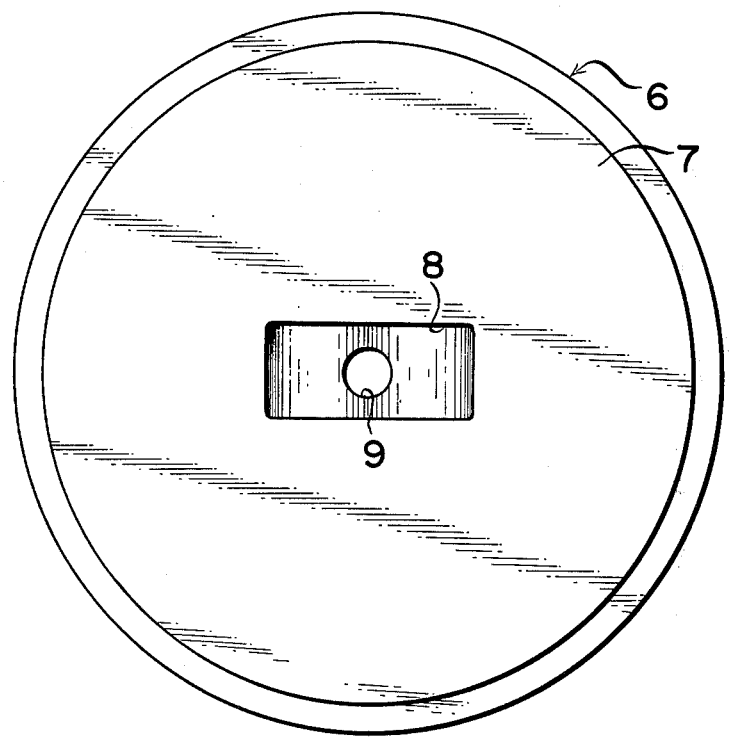
FIG. 4 is a plan view of a lower die used for the first step.

In the drawings reference numeral 1 denotes an upper die used for the first step comprising a body 2 having a rectangular hole 3 formed in the central part thereof in which a pressure die 4' can be inserted, said die body 2 having a projected part 5 formed in the lower surface thereof. The lower end of the pressure die 4 is formed in semicircular shape in section.

Reference numeral 6 represents a lower die used for the first step comprising a body 7 having a cavity 8 formed in the upper and central part thereof and also an escape hole 9 formed so as to extend downwards from the bottom part of the cavity 8.

Figure 5:
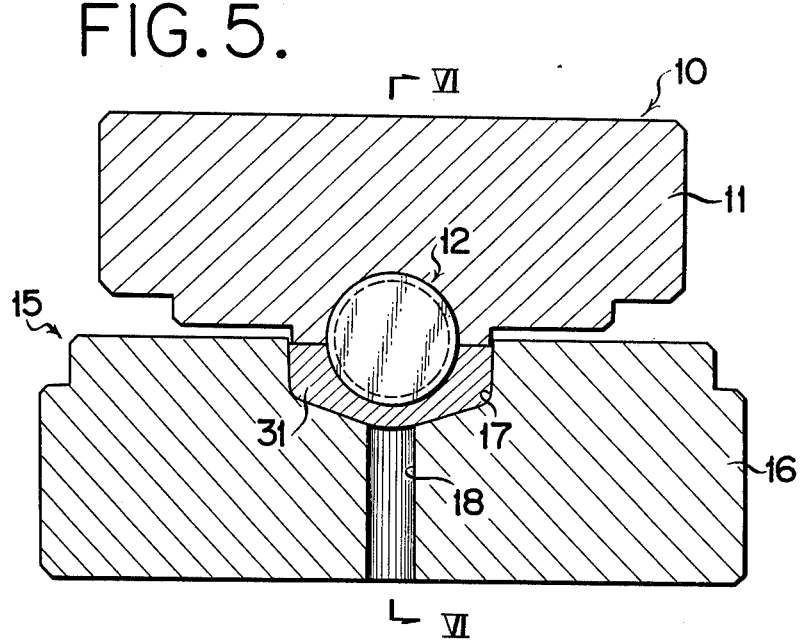
FIG. 5 is a longitudinal sectional view of dies used for the second step.
Figure 6:
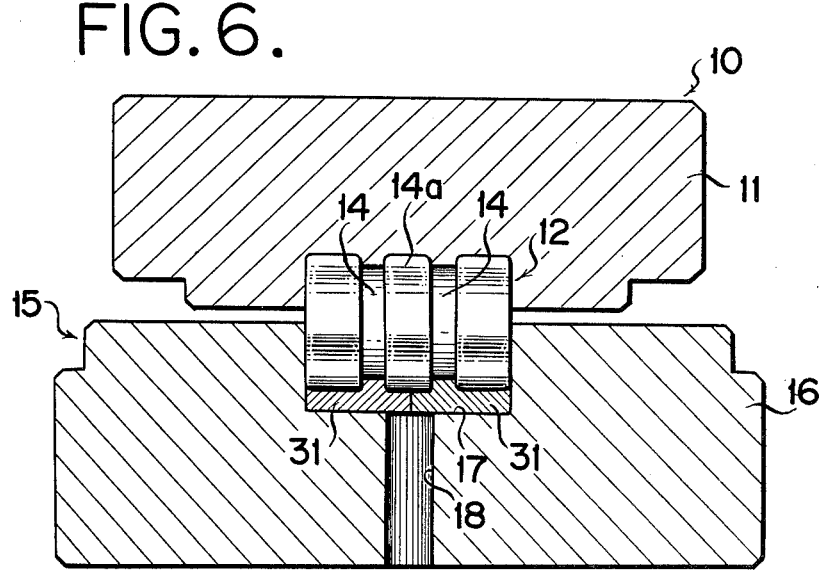
FIG. 6 is a sectional view taken along a line VI — VI of FIG. 5.
Figure 7:
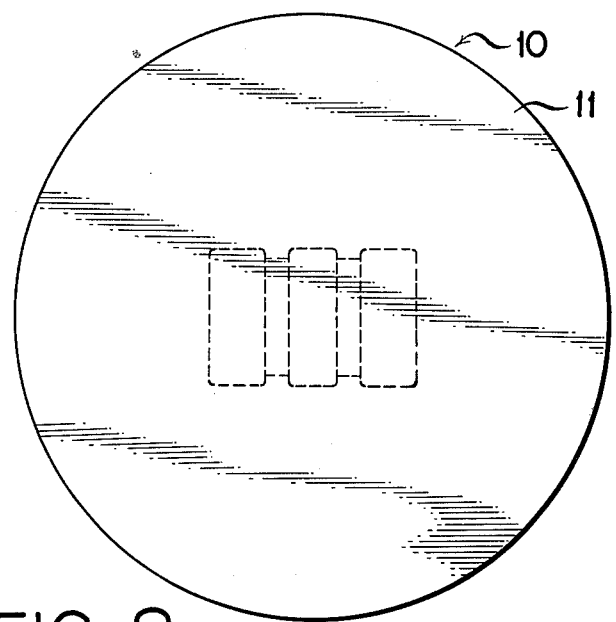
FIG. 7 is a plan view of an upper die used for the second step.

In FIG. 5, reference numeral 10 denotes an upper die used for the second step which comprises a body 11, having a cavity formed in the lower and central part thereof in which a pressure die 12 can be inserted as shown in FIGS. 5, 6 and 7. The pressure die 12 comprises a cylindrical body having two annular grooves 14 formed therein as clearly shown in particular in FIG. 6.

Figure 8:
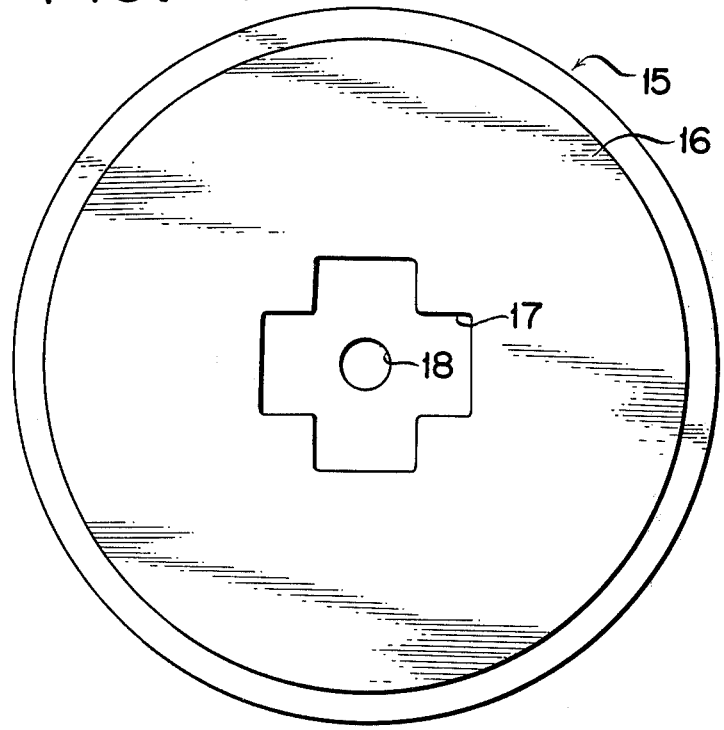
FIG. 8 is a plan view of a lower die used for the second step.

Reference numeral 15 denotes a lower die used for the second step comprising a body 16 having a cavity 17 formed in the upper and central part thereof as shown in FIGS. 5, 6 and 8. An escape hole 18 is formed in the body 16 so as to extend downwards from the bottom of the cavity 17. The cavity 17 is of a cross shape and has an width dimension approximately equal to the width of the pressure die 12 used for the second step.

Figure 9:
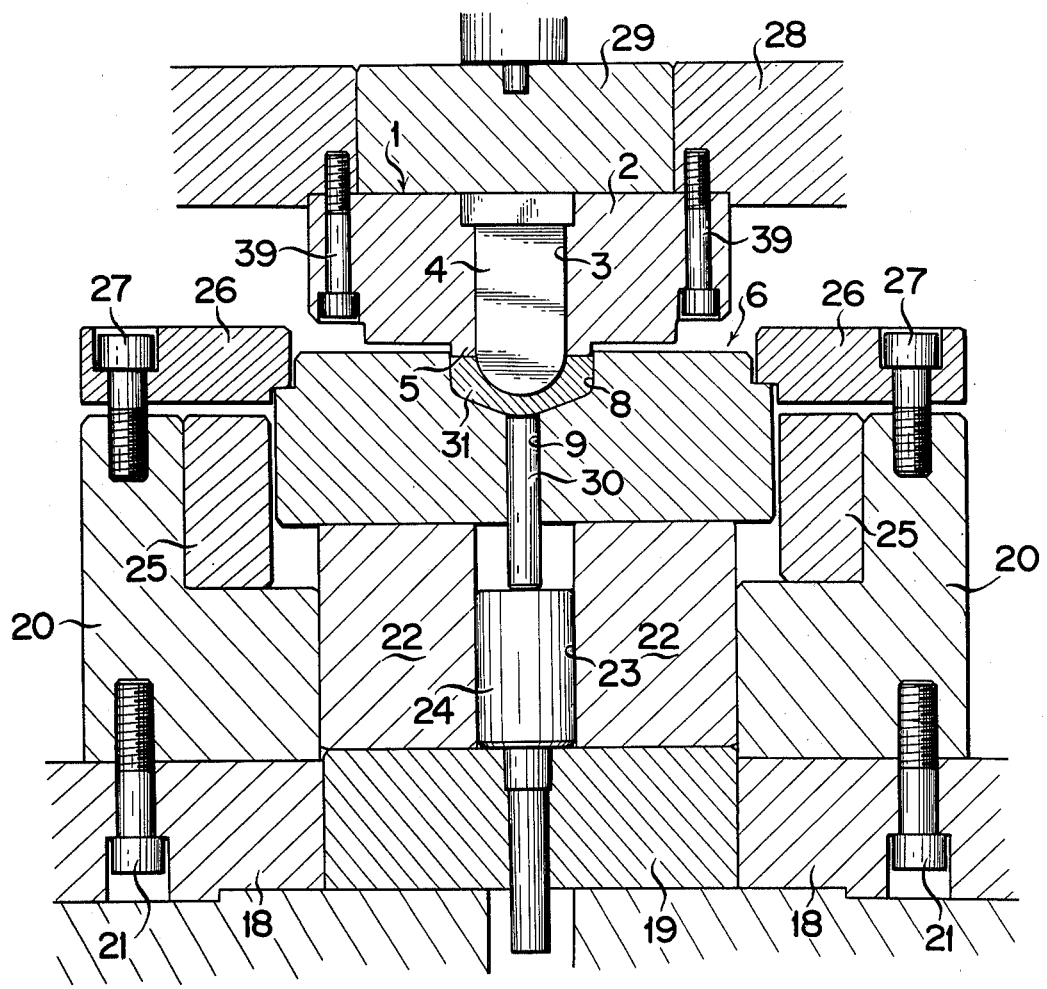
FIG. 9 is a sectional view of a press machine having the upper and lower dies for the first step mounted in position, FIGS. 10 A, B, C and D are views for explaining the method of producing metal connector fittings for pipes according to the present invention, FIGS. 11 A', B', and C' show another configuration of blanks used for the method of the present invention.

Referring to FIG. 9, a press machine is shown on which the upper die 1 and the lower die 6 are mounted. The press machine comprises a lower die set 18 in which is fitted a lower die set spacer 19. A round die set 20 rests on the lower die set 18, and the die sets 18 and 20 are fixedly secured by means of bolts 21. A ring spacer 22 having a hole 23 formed in the centre thereof is fitted in the round die set 20. Inserted in the hole 23 is a member 24. Set within the round die set 20 is a ring 25. Further, a clamp ring 26 is secured to the round die set 20 by means of bolts 27. Reference numeral 28 represents an upper die set in which is fitted an upper die set spacer 29. A knock pin 30 is inserted in the escape hole 9 so that the lower end of the knock pin may abut against the upper end of the member 24.

The upper die 1 is fixedly secured to the upper die set 28 by means of bolts 39. After that the lower die 6 is allowed to rest on the ring spacer 22, and then the clamp ring 26 is put on the lower die 6 and fixedly secured to the round die set 20 by means of the bolts 27.

Thereafter, two pieces of square shaped blanks 31 as shown in FIG. 10A are placed side by side in the cavity 8 of the lower die 6 for the first step. Next, the upper die set 28 is moved dounwardly so that a semicircular recess 32 can be formed in each of the blanks 31 as shown in FIG. 10C by the press action of the pressure die 4 of the upper die 1 for the first step.

Figure 12:
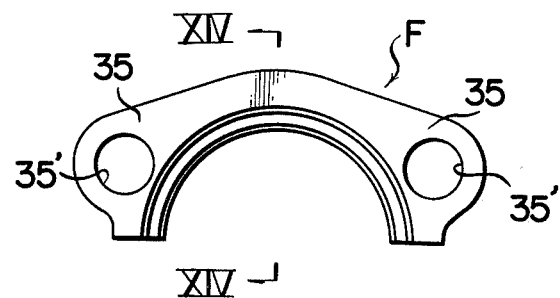
FIG. 12 is a plan view of a finished product.
Figure 13:
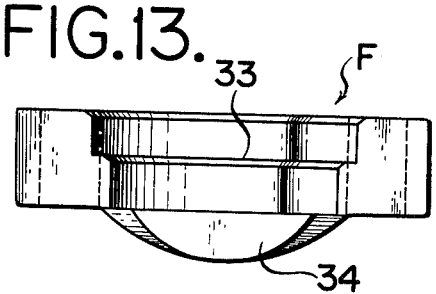
FIG. 13 is a side elevational view of the same.
Figure 14:
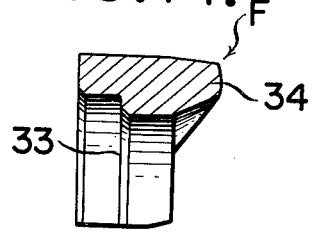
FIG. 14 is a sectional view taken along line XIV — XIV of FIG. 12.
Figure 15:
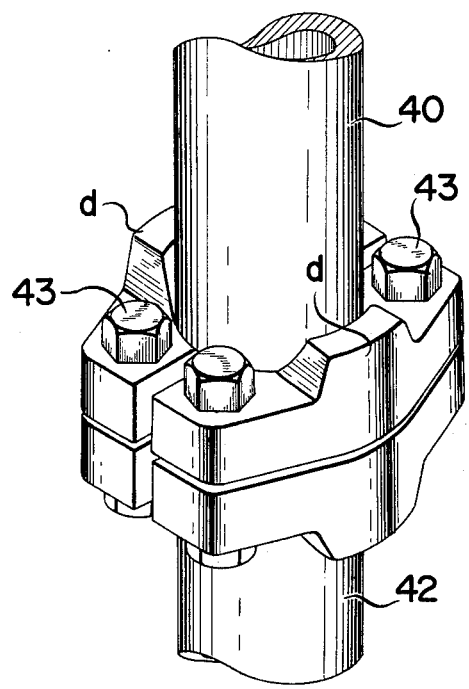
FIG. 15 is a perspective view of pipes connected by connector fittings produced by the method of the present invention.
Figure 16:
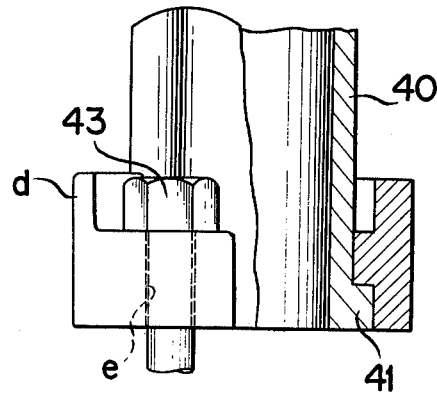
FIG. 16 is an explanatory view of the same shown partially in section.

Subsequently, the blanks 31 are placed in the cavity 17 of the lower die 15 for the second step set in another press machine, and then the upper die 10 for the second step is moved downwards so that the blanks can be pressed by the press action of the pressure die 12. In this case, the annular projection 14a of the pressure die 12 presses or urges against the blanks 31 along the joint line 36, while the annular grooves 14, 14 of the pressure die 12 press other sections of the blanks 31 so that the latter can be formed with steps or the outer parts of the blanks can project partially along the cavity 17. When the second step has thus been completed, each of the blanks 31 can be formed with a holding surface 33 consisting of a step for holding a flange 41 of a pipe 40, a projected part 34 and a surface 35 for attachment at the same time. The surface 35 for attachment of the blank 31 is then formed with bolt holes 35' to obtain connector fittings F as shown in FIGS. 12, 13 and 14.

In the foregoing method, square bars are employed as the blanks 31; however, round bars as shown in FIG. 11 may also be employed. In that case, two lengths of round bars are formed flat as shown at 37 on both sides thereof, and then the flat surfaces 37 are placed in contact side by side so that they can be subjected to the first process. Four sets of the connector fittings thus obtained can be used to connect pipes 40 and 42 by means of bolts 43 with their flanges kept in contact with each other.

It is to be understood that the above description is by way of example only, and that the details for carrying the invention into practice may be varied without departing from the scope of the invention claimed.

What is claimed is:

1. A method of producing connector fittings for pipes, comprising attaching a first upper die to an upper die set and a first lower die to a lower die set, respectively, said first upper die having a hole formed in the central part thereof in which a pressure die can be inserted, said first lower die having a cavity formed in the upper surface thereof, placing a pair of blanks in the cavity of said first lower die, pressing said blanks with said pressure die so as to form a semicircular recess in the upper surface of said blanks, attaching a second upper die to said upper die set and a second lower die to said lower die set, respectively, said second upper die having a cavity in its lower surface to receive a second pressure die, said second lower die having a cavity formed in the upper surface thereof, placing said pair of blanks in the cavity of said second lower die, and pressing said blanks with said second pressure die thereby forming a pair of connector fittings, each having a semicircular inner recess for holding flange of a pipe and a pair of surface in which bolt holes are formed.

2. The method of claim 1 wherein said blank is rectangular in cross section.

3. The method of claim 1 wherein said second pressure die is of a cylindrical shape having a pair of annular grooves formed in the outer peripheral surface thereof.

* * * * *